(12) United States Patent  
Shazeer et al.

(10) Patent No.: US 12,067,476 B2
(45) Date of Patent: *Aug. 20, 2024

(54) MIXTURE OF EXPERTS NEURAL NETWORKS

(71) Applicant: Google LLC, Mountain View, CA (US)

(72) Inventors: Noam M. Shazeer, Palo Alto, CA (US); Azalia Mirhoseini, Mountain View, CA (US); Krzysztof Stanislaw Maziarz, Jaslo (PL)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,171

(22) Filed: Sep. 8, 2023

(65) Prior Publication Data
US 2023/0419079 A1 Dec. 28, 2023

Related U.S. Application Data

(63) Continuation of application No. 16/879,187, filed on May 20, 2020, now Pat. No. 11,790,214, which is a
(Continued)

(51) Int. Cl.
G06N 3/045 (2023.01)
G06N 3/08 (2023.01)

(52) U.S. Cl.
CPC .............. *G06N 3/045* (2023.01); *G06N 3/08* (2013.01)

(58) Field of Classification Search
None
See application file for complete search history.

(56) References Cited

U.S. PATENT DOCUMENTS

| 6,208,983 B1 | 3/2001 | Parra et al. |
| 10,032,256 B1 | 7/2018 | Anaya et al. |
| 2013/0262096 A1 | 10/2013 | Wilhelms-Tricarico et al. |

FOREIGN PATENT DOCUMENTS

| CN | 1524460 A | 9/2004 |
| CN | 101634605 A | 1/2010 |

(Continued)

OTHER PUBLICATIONS

Office Action in Chinese Appln. No. 201780068472.2, dated Feb. 17, 2023, 17 pages (with English Translation).
(Continued)

*Primary Examiner* — Vincent Gonzales
(74) *Attorney, Agent, or Firm* — Fish & Richardson P.C.

(57) ABSTRACT

A system includes a neural network that includes a Mixture of Experts (MoE) subnetwork between a first neural network layer and a second neural network layer. The MoE subnetwork includes multiple expert neural networks. Each expert neural network is configured to process a first layer output generated by the first neural network layer to generate a respective expert output. The MoE subnetwork further includes a gating subsystem that selects, based on the first layer output, one or more of the expert neural networks and determine a respective weight for each selected expert neural network, provides the first layer output as input to each of the selected expert neural networks, combines the expert outputs generated by the selected expert neural networks in accordance with the weights for the selected expert neural networks to generate an MoE output, and provides the MoE output as input to the second neural network layer.

18 Claims, 3 Drawing Sheets

Related U.S. Application Data continuation of application No. 16/393,063, filed on Apr. 24, 2019, now Pat. No. 10,719,761, which is a continuation of application No. PCT/US2017/059909, filed on Nov. 3, 2017.

(60) Provisional application No. 62/432,497, filed on Dec. 9, 2016, provisional application No. 62/418,135, filed on Nov. 4, 2016.

(56) References Cited

FOREIGN PATENT DOCUMENTS

| | | |
|---|---|---|
| CN | 101793887 A | 8/2010 |
| CN | 103324981 A | 9/2013 |
| CN | 103488887 A | 1/2014 |
| CN | 104732274 A | 6/2015 |
| CN | 105445646 A | 3/2016 |
| CN | 105719001 A | 6/2016 |
| CN | 105868829 A | 8/2016 |
| CN | 105913450 A | 8/2016 |
| JP | H06266688 A | 9/1994 |
| JP | H0962645 A | 3/1997 |
| JP | 2000251057 A | 9/2000 |

OTHER PUBLICATIONS

Abadi et al., "TensorFlow: Large-Scale Machine Learning on Heterogeneous Distributed Systems," arXiv, Mar. 16, 2016, 19 pages.
Aljundi et al., "Expert Gate: Lifelong Learning with a Network of Experts," arXiv, Apr. 19, 2017, 10 pages.
Almahairi et al., "Dynamic Capacity Networks," arXiv, May 22, 2016, 10 pages.
Amodei et al., "Deep Speech 2: End-to-End Speech Recognition in English and Mandarin," arXiv, Dec. 8, 2015, 28 pages.
Bahdanau et al., "Neural Machine Translation by Jointly Learning to Align and Translate," arXiv, May 19, 2016, 15 pages.
Bengio et al., "Conditional Computation in Neural Networks for faster models," arXiv, Jan. 7, 2016, 12 pages.
Bengio et al., "Estimating or Propagating Gradients Through Stochastic Neurons for Conditional Computation," arXiv, Aug. 15, 2013, 12 pages.
Chelba et al., "One Billion Word Benchmark for Measuring Progress in Statistical Language Modeling," arXiv, Mar. 4, 2014, 6 pages.
Cho et al., "Exponentially Increasing the Capacity-to-Computation Ratio for Conditional Computation in Deep Learning," arXiv, Jun. 28, 2014, 6 pages.
CN Office Action in Chinese Appln. No. 201780068472.2, dated Sep. 1, 2022, 31 pages (with English Translation).
Collobert et al., "A parallel mixture of SVMs for very large scale problems," Neural Computation, May 2002, 14(5):1105-1114.
Davis et al., "Low-Rank Approximations for Conditional Feedforward Computation in Deep Neural Networks," arXiv, Jan. 28, 2014, 10 pages.
Deisenroth et al., "Distributed Gaussian Processes," Proceedings of the 32nd International Conference on Machine Learning, 2015, 37:1481-1490.
Deng et al., "Application of rough set, neural network and expert system model for diagnosis of power system fault," High Voltage Techniques, Jul. 31, 2009, 5 pages (with English Abstract).
Denoyer et al., "Deep Sequential Neural Network," arXiv, Oct. 2, 2014, 9 pages.
Duchi et al., "Adaptive subgradient methods for online learning and stochastic optimization," Journal of Machine Learning Research, Jul. 2011, 12:2121-2159.
Durrani et al., "Edinburgh's phrase-based machine translation systems for WMT-14," Proceedings of the Ninth Workshop on Statistical Machine Translation, Jun. 2014, 8 pages.
Eigen et al., "Learning factored representaitons in deep mixture of experts," arXiv, Mar. 9, 2014, 8 pages.
Eigen et al., "Learning Factored Representations in a Deep Mixture of Experts," arXiv, Mar. 9, 2014, 8 pages.
EP Office Action in European Application No. 17804369.1, dated Jul. 2, 2021, 11 pages.
Garmash et al., "Ensemble learning for multi-source neural machine translation," Coling, 2016, 10 pages.
Gers et al., "Learning to Forget: Continual Prediction with LSTM," Neural Computation, Oct. 2000, 12(10):2451-2471.
Gruslys et al., "Memory-Efficient Backpropagation Through Time," arXiv, Jun. 10, 2016, 14 pages.
He et al., "Deep Residual Learning for Image Recognition," Proceedings of the IEEE Conference on Computer Vision and Pattern Recognition (CVPR), Jun. 2016, pp. 770-778.
Hinton et al., "Deep Neural Networks for Acoustic Modeling in Speech Recognition: The Shared Views of Four Research Groups," IEEE Signal Processing Magazine, Nov. 2012, 29(6):82-97.
International Search Report and Written Opinion in International Appln. No. PCT/US2017/059909, dated Feb. 7, 2018, 14 pages.
Ioffe et al., "Batch Normalization: Accelerating Deep Network Training by Reducing Internal Covariate Shift," arXiv, Mar. 2, 2015, 11 pages.
Jacobs et al., "Adaptive Mixtures of Local Experts," Neural Computation, Mar. 1991, 3(1):79-87.
Johnson et al., "Google's Multilingual Neural Machine Translation System: Enabling Zero-Shot Translation," arXiv, Aug. 21, 2017, 17 pages.
Jordan et al., "Hierarchical mixtures of experts and the EM algorithm," MA Institute of Technology, 1993, 31 pages.
Jordan et al., "Hierarchical Mixtures of Experts and the EM Algorithm," Neural Computation, Mar. 1994, 6(2):181-214.
Jozefowicz et al., "Exploring the Limits of Language Modeling," arXiv, Feb. 11, 2016, 11 pages.
Kingma et al., "Adam: A Method for Stochastic Optimization," arXiv, Jan. 30, 2017, 15 pages.
Kneser et al., "Improved backing-off for M-gram language modeling," Presented at International Conference on Acoustics, Speech, and Signal Processing, Detroit, MI, USA, May 9-12, 1995, pp. 181-184.
Krizhevsky et al., "Imagenet classification with deep convolutional neural networks," Communications of the ACM, Jun. 2017, 60(6):84-90.
Le et al., "Building high-level features using large scale unsupervised learning," arXiv, Jul. 12, 2012, 11 pages.
Leonard et al., "Distributed conditional computation," Memoire de maitrise en informatique de l'universite de montreal, Aug. 2014, 90 pages.
Luong et al., "Addressing the Rare Word Problem in Neural Machine Translation," arXiv, May 30, 2015, 9 pages.
Luong et al., "Effective Approaches to Attention-based Neural Machine Translation," arXiv, Sep. 20, 2015, 11 pages.
Ng et al., "Hierarchical mixture-of-experts model for large-scale Gaussian process regression," arXiv, Dec. 9, 2014.
Rasmussen et al., "Infinite Mixtures of Gaussian Process Experts," Advances in Neural Information Processing Systems, 2001, 8 pages.
Sak et al., "Long short-term memory recurrent neural network architectures for large scale acoustic modeling," Interspeech, 2014, pp. 338-342.
Schuster et al., "Japanese and Korean voice search," Presented at IEEE International Conference on Acoustics, Speech and Signal Processing (ICASSP), Kyoto, Japan, Mar. 25-30, 2012, pp. 5149-5152.
Shahbaba et al., "Nonlinear models using dirichlet process mixtures," Journal of Machine Learning Research, Aug. 2009, 10:1829-1850.
Sutskever et al., "Sequence to Sequence Learning with Neural Networks," Advances in Neural Information Processing Systems, 2014, 9 pages.
Theis et al., "Generative Image Modeling Using Spatial LSTMs," Advances in Neural Information Processing Systems, 2015, 9 pages.
Tresp, "Mixtures of Gaussian Processes," Advances in Neural Information Processing Systems, 2000, 7 pages.

(56) References Cited

OTHER PUBLICATIONS

Wu et al., "Google's Neural Machine Translation System: Bridging the Gap between Human and Machine Translation," arXiv, Oct. 8, 2016, 23 pages.
Yao et al., "Hierarchical Mixture of Classification Experts Uncovers Interactions between Brain Regions," Advances in Neural Information Processing Systems, 2009, 9 pages.
Zaremba et al., "Recurrent Neural Network Regularization," arXiv, Feb. 19, 2015, 8 pages.
Zhou et al., "Deep Recurrent Models with Fast-Forward Connections for Neural Machine Translation," arXiv, Jul. 23, 2016, 13 pages.
Office Action in European Appln. No. 17804369.1, dated Sep. 29, 2023, 14 pages.

200

Receive as input a first layer output generated by a previous neural network layer
202

Select, based on the first layer output, one or more of expert neural networks and determine a respective weight for each selected expert neural network
204

Provide the first layer output as input to each of the selected expert neural networks
206

Combine the expert outputs generated by the selected expert neural networks in accordance with the weights for the selected expert neural networks to generate an MoE output
208

FIG. 2

MIXTURE OF EXPERTS NEURAL NETWORKS

CROSS-REFERENCE TO RELATED APPLICATIONS

111 This patent application is a continuation (and claims the benefit of priority under 35 USC 120) of U.S. patent application Ser. No. 16/879,187, filed May 20, 2020, which is a continuation of U.S. patent application Ser. No. 16/393,063, filed Apr. 24, 2019, now U.S. Pat. No. 10,719,761, which claims the benefit of International Application No. PCT/US2017/059909, filed on Nov. 3, 2017, which claims priority to U.S. Provisional Application Ser. No. 62/432,497, filed on Dec. 9, 2016 and U.S. Provisional Application Ser. No. 62/418,135, filed on Nov. 4, 2016. The disclosures of these prior applications are considered part of and are incorporated by reference in the disclosure of this application.

BACKGROUND

This specification relates to processing inputs through the layers of neural network to generate outputs.

Neural networks are machine learning models that employ one or more layers of nonlinear units to predict an output for a received input. Some neural networks include one or more hidden layers in addition to an output layer. The output of each hidden layer is used as input to another layer in the network, i.e., another hidden layer or the output layer. Each layer of the network generates an output from a received input in accordance with current values of a respective set of parameters.

SUMMARY

In general, one innovative aspect of the subject matter described in this specification can be embodied in a system implemented as computer programs on one or more computers in one or more locations that includes a neural network. The neural network includes a Mixture of Experts (MoE) subnetwork between a first neural network layer and a second neural network layer in the neural network. The MoE subnetwork includes a plurality of expert neural networks, in which each expert neural network is configured to process a first layer output generated by the first neural network layer in accordance with a respective set of expert parameters of the expert neural network to generate a respective expert output. The MoE subnetwork further includes a gating subsystem configured to: select, based on the first layer output, one or more of the expert neural networks and determine a respective weight for each selected expert neural network, provide the first layer output as input to each of the selected expert neural networks, combine the expert outputs generated by the selected expert neural networks in accordance with the weights for the selected expert neural networks to generate an MoE output, and provide the MoE output as input to the second neural network layer.

The foregoing and other embodiments can each optionally include one or more of the following features, alone or in combination. The expert neural networks may have the same or similar architectures but different parameter values. Combining the expert outputs generated by the selected expert neural network may include: weighting the expert output generated by each of the selected expert neural networks by the weight for the selected expert neural network to generate a weighted expert output, and summing the weighted expert outputs to generate the MoE output. The gating subsystem may include a gating subnetwork, in which the gating subnetwork is configured to: process the first layer output to generate a weight vector that includes a respective weight for each of the plurality of expert neural networks in accordance with a set of gating parameters, and select one or more of the expert neural networks based on the weights in the weight vector. The weight vector may be a sparse vector that includes non-zero weights for only a few of the expert neural networks. Selecting one or more the expert neural networks may include selecting only expert neural networks that have non-zero weights in the weight vector.

Processing the first layer output to generate a weight vector that includes a respective weight for each of the plurality of expert neural networks in accordance with a set of gating parameters may include: generating an initial gating output, wherein generating the initial gating output comprises applying the set of gating parameters to the first layer output; applying a sparsifying function to the initial gating output to generate a sparsified initial gating output; and applying a softmax function to the sparsified initial gating output to generate the weight vector.

Generating the initial gating output may include: applying the set of gating parameters to the first layer output to generate a modified first layer output; and adding tunable Gaussian noise to the modified first layer output to generate the initial gating output. Adding tunable Gaussian noise to the modified first layer output to generate the initial gating output may include: applying a set of trainable noise parameters to the first layer output to generate an initial noise output; element-wise multiplying the initial noise output by a vector of noise values sampled from a normal distribution to generate a final noise output; and adding the final noise output to the modified first layer output. The sparsifying function sets all values in the initial gating output other than the k highest values to a value that is mapped to zero by the softmax function. The gating subsystem comprises a parent gating subnetwork and a plurality of child gating subnetworks, in which each of the child gating subnetworks manages a disjoint subset of the plurality of expert neural networks from each other child gating subnetwork.

Another innovative aspect of the subject matter described in this specification can be embodied in a method including: receiving a network input; and processing the network input using the system described above to generate a network output for the network input.

Other innovative aspects of the subject matter described in this specification can be embodied in one or more non-transitory storage media encoded with instructions that when implemented by one or more computers cause the one or more computers to implement the system and method described above.

The subject matter described in this specification can be implemented in particular embodiments so as to realize one or more of the following advantages. While some MoE implementations involve significant training time and computational costs, various embodiments described herein relate to MoE implementations which improve computational capacity without greatly increasing computing resource requirements. In particular, various embodiments described in this specification relate to MoE implementations in which computational capacity (number of parameters) of a neural network that includes a MoE subnetwork can be increased by leveraging the availability of a large number of expert neural networks. In some MoE implementations described herein, only a small number of the expert neural networks are selected during the processing of any given network input by the neural network, and hence the processing time and computing resources necessary to process an inference using the neural network can be maintained at a reasonable level. That is, computational capacity can be greatly increased while maintaining a reasonable processing time and without greatly increasing how many computing resources are required to process an inference. As a result, the neural network can achieve significantly better results (e.g., better prediction accuracy) than prior approaches at reasonable processing time and computational costs, especially for tasks where model capacity is critical for absorbing the vast quantities of knowledge available in the training dataset. Therefore, the subject matter described in this specification may be implemented in particular embodiments to achieve various technical benefits. Moreover, neural network systems in accordance with various embodiments may be applied for a variety of technical purposes, including but not limited to estimating the likelihood that an image contains an image of an object belonging to a category.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for generating a mixture-of-experts (MoE) output for an input.

Like reference numbers and designations in the various drawings indicate like elements.

DETAILED DESCRIPTION

Figure 1:
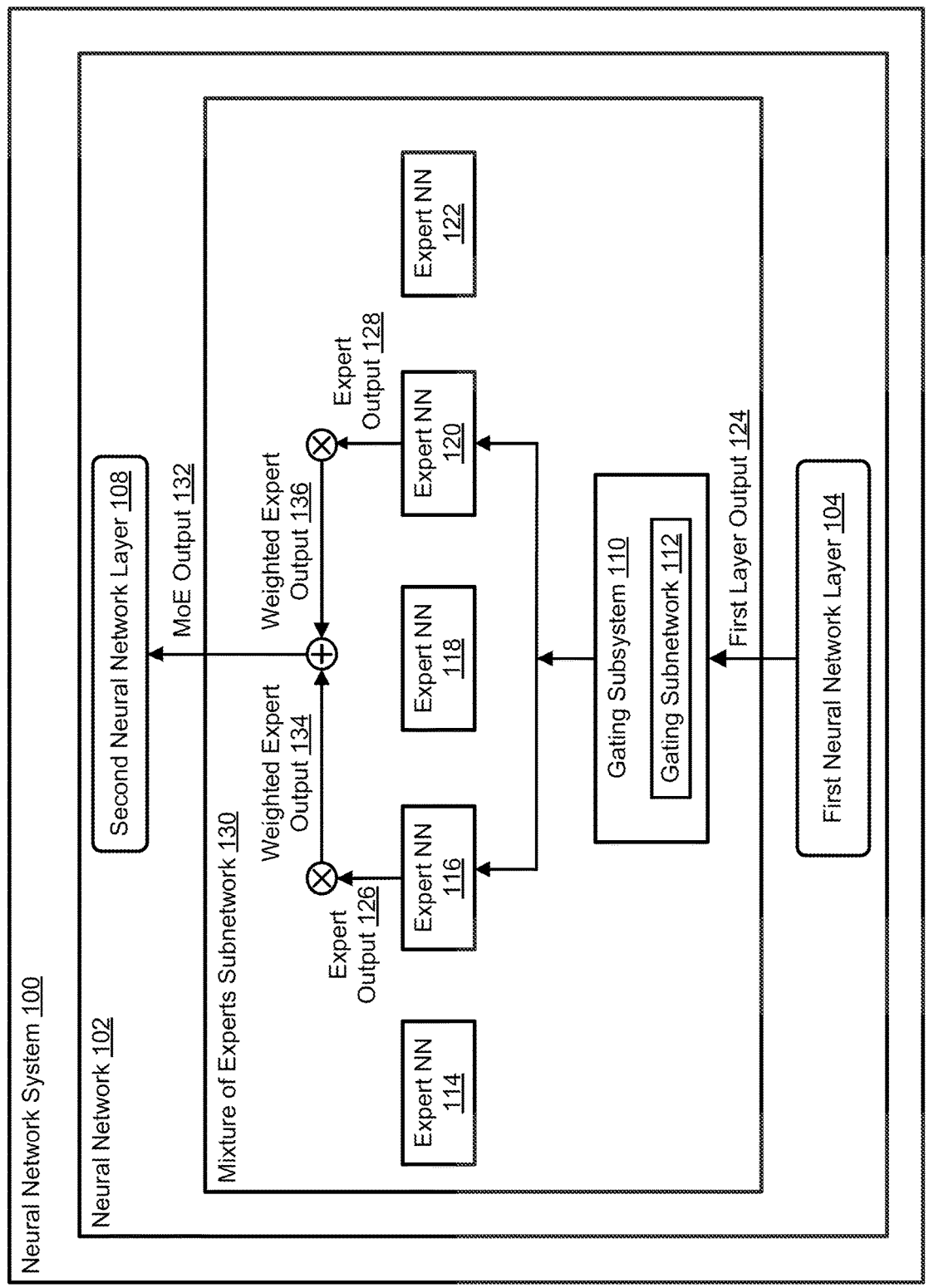
FIG. 1 is a block diagram of an example of a neural network system.

FIG. 1 shows an example of a neural network system 100. The neural network system 100 is an example of a system implemented as computer programs on one or more computers in one or more locations, in which the systems, components, and techniques described below can be implemented. Generally, the system 100 includes a neural network 102 that can be configured to receive any kind of digital data input and to generate any kind of score, classification, or regression output based on the input. For example, the neural network 102 can be configured as a language model neural network. For example the neural network 102 can receive a sequence that includes text at multiple positions and to process the input text sequence to generate a network output to perform, e.g., a language modelling task or a machine translation task.

As another example, if the inputs to the neural network 102 are images or features that have been extracted from images, the output generated by the neural network 102 for a given image may be scores for each of a set of object categories, with each score representing an estimated likelihood that the image contains an image of an object belonging to the category.

As another example, if the inputs to the neural network 102 are Internet resources (e.g., web pages), documents, or portions of documents or features extracted from Internet resources, documents, or portions of documents, the output generated by the neural network for a given Internet resource, document, or portion of a document may be a score for each of a set of topics, with each score representing an estimated likelihood that the Internet resource, document, or document portion is about the topic.

As another example, if the inputs to the neural network 102 are features of an impression context for a particular content element, the output generated by the neural network 102 may be a score that represents an estimated likelihood that the particular content element will be clicked on.

As another example, if the inputs to the neural network 102 are features of a personalized recommendation for a user, e.g., features characterizing the context for the recommendation, e.g., features characterizing previous actions taken by the user, the output generated by the neural network 102 may be a score for each of a set of content elements, with each score representing an estimated likelihood that the user will respond favorably to being recommended the content element.

As another example, if the input to the neural network 102 is a sequence of text in one language, the output generated by the neural network 102 may be a score for each of a set of pieces of text in another language, with each score representing an estimated likelihood that the piece of text in the other language is a proper translation of the input text into the other language.

As another example, if the input to the neural network 102 is a sequence representing a spoken utterance, the output generated by the neural network 102 may be a score for each of a set of pieces of text, each score representing an estimated likelihood that the piece of text is the correct transcript for the utterance.

The neural network 102 includes a stack of neural network layers. The stack of neural network layers can be any kind of neural network layers, for example, Long Short-Term Memory (LSTM) neural network layers or other recurrent neural network layers, convolutional neural network layers, or fully-connected neural network layers. In some implementations, the stack of neural network layers may include a mixture of two or more different kinds of neural network layers. To increase the computational capacity of the neural network 102, the neural network 102 includes one or more Mixture of Experts (MoE) subnetworks between the stacked neural network layers.

In particular, as shown in FIG. 1, the neural network 102 includes a MoE subnetwork 130 arranged between a first neural network layer 104 and a second neural network layer 108 in the neural network 102. The first neural network layer 104 and the second neural network layer 108 can be any kind of neural network layer, for example, a LSTM neural network layer or other recurrent neural network layer, a convolutional neural network layer, or a fully-connected neural network layer. In some implementations, one or both of the first neural network layer 104 and the second neural network layer 108 can be other MoE subnetworks.

The MoE subnetwork 130 includes multiple expert neural networks, e.g., expert neural networks 114-122. Each expert neural network in the MoE subnetwork 130 can be configured to process a first layer output 124 generated by the first neural network layer 104 in accordance with a respective set of expert parameters of the expert neural network to generate a respective expert output.

While FIG. 1. shows that the MoE subnetwork 130 includes only five expert neural networks, in general, a MoE subnetwork can include a large number of expert neural networks, e.g., thousands of expert neural networks. Each expert neural network can be a feed-forward neural network with its own parameters. The expert neural networks are configured to receive the same sized inputs and produce the same-sized outputs. In some implementations, the expert neural networks are feed-forward neural networks with identical architectures, but with different parameters. Each expert neural network may have a very large number of parameters. For example, each expert neural network may have one to two million parameters, making the total number of parameters of the MoE subnetwork to billions of parameters.

Although the MoE subnetwork includes a large number of expert neural networks, only a small number of them are selected during the processing of any given network input by the neural network 102, e.g., only a small number of the expert neural networks are selected to process the first layer output 124. The neural network 102 includes a gating subsystem 110 that is configured to select, based on the first layer output 124, one or more of the expert neural networks, and determine a respective weight for each selected expert neural network. The gating subsystem 110 then provides the first layer output as input to each of the selected expert neural networks. The gating subsystem 110 combines the expert outputs generated by the selected expert neural networks in accordance with the weights for the selected expert neural networks to generate a MoE output 132. The gating subsystem 110 then provides the MoE output 132 as input to the second neural network layer 108.

In particular, the gating subsystem 110 includes a gating subnetwork 112 that is configured to process the first layer output to generate a weight vector that includes a respective weight for each of the plurality of expert neural networks in accordance with a set of gating parameters of the gating subnetwork, and to select one or more of the expert neural networks based on the weights in the weight vector.

For example, assuming the MoE subnetwork 130 includes a set of n expert neural networks $E_1, \ldots, E_n$, the gating subnetwork 112, denoted as G, is configured to process a given input x (e.g., the first layer output 124) to generate a weight vector G(x). The weight vector G(x) includes a respective weight for each expert neural network in the set of n expert neural networks. The gating subnetwork 112 is configured to select one or more expert neural networks from the set of n expert neural networks based on the weights in the weight vector G(x). In particular, the weight vector G(x) is a sparse n-dimensional vector that includes non-zero weights for only a few of the expert neural networks in the set. The number of non-zero weights is an integer and is very small in comparison with the number of expert neural networks in the MoE subnetwork 130. For example, the MoE subnetwork 130 may have hundreds to thousands of expert neural networks, and the weight vector G(x) may have one or two non-zero weights. The number of non-zero weights can be determined based on criteria such as computational costs, model quality (e.g., prediction quality), and whether the MoE subnetwork 130 is under a testing or training condition. Generally, smaller numbers of non-zero weights require less computation while larger numbers of non-zero weights lead to higher model quality. The number of non-zero weights is larger than 1 in order to train the MoE subnetwork 130. The gating subnetwork 112 selects only expert neural networks that have non-zero weights in the weight vector G(x). For example, the expert neural networks 116 and 120 in FIG. 1 have non-zero weights and therefore are selected for further processing.

The process for generating the weight vector with a pre-determined number of non-zero weights is described in more detail below with reference to FIG. 3.

After the weight vector has been generated and one or more expert neural networks (e.g., expert neural networks 116 and 120) have been selected, the gating subsystem 110 combines the expert outputs generated by the selected expert neural networks by weighting the expert output generated by each of the selected expert neural networks (e.g., expert output 126 generated by the expert neural network 116 and expert output 128 generated by the expert neural network 120) by the weight for the selected expert neural network to generate a weighted expert output, and summing the weighted expert outputs (e.g., the weighted expert outputs 134 and 136) to generate the MoE output 132.

In particular, the MoE output 132 can be expressed as follows:

$$y = \sum_{i=1}^{n} G(x)_i E_i(x),$$

where y is the MoE output that is computed based on the sparsity of the output of the weight vector G(x). That means wherever $G(x)_i=0$, the i-th expert neural network E ti in the set of expert neural networks does not need to compute the respective expert output $E_i(x)$.

After generating the MoE output 132, the gating subsystem 110 provides the MoE output 132 as input to the second neural network layer 108 for further processing.

In some implementations, the second neural network layer 108 can be another MoE subnetwork instead of a conventional neural network layer.

In some implementations, if the number of expert neural networks is very large (for example, more than one thousand expert neural networks), the branching factor of the gating subnetwork 112 can be reduced by using a multi-level hierarchical MoE subnetwork. For example, in a two-level hierarchical MoE subnetwork, the gating subsystem 110 can include a parent gating subnetwork and multiple child gating subnetworks, in which each of the child gating subnetworks is itself a secondary MoE subnetwork with its own gating subnetwork. Each of the child gating subnetworks manages a disjoint subset of multiple expert neural networks from each other child gating subnetwork. The parent gating subnetwork chooses a sparse weighted combination of the child gating subnetworks and generates a MoE output based on the sparse weighted combination.

The use of conditional computation, where parts of the MoE subnetwork 130 are active on a per-input example basis, can significantly increase the computational capacity of the neural network 102 without a proportional increase in computation. This is because the MoE subnetwork 130 can have thousands of expert neural networks but only very few expert neural networks need to be evaluated for each input. As a result, the neural network 102 can achieve significantly better results than prior approaches at lower computational costs, especially for tasks such as language modeling and machine translation, where model capacity is critical for absorbing the vast quantities of knowledge available in the training corpora. As an example, the neural network 102 can be trained on a language modeling task that has a dataset including a billion to a hundred billion words. In another example, the neural network 102 can be trained on a single language pair machine translation task with a dataset of tens of millions of sentence pairs. In yet another example, the neural network 102 can be trained on a multilingual machine translation task that has a very large combined dataset of twelve language pairs. During training, various components of the neural network 102 can be trained jointly by backpropagation. After training, the neural network 102 can be used to perform a language modelling task or a machine translation task. For example, in some implementations, the neural network 102 is configured to receive as input an input text sequence and to process the input text sequence to generate a network output, in which the input text sequence has respective text located at a plurality of corresponding positions. To generate a network output, the neural network 102 uses the gating subsystem 110 to select, for each position in the input text sequence, a respective combination of one or more expert neural networks from the set of n expert neural networks to be active for the processing of the text located at the position. Through training, the gating subsystem 110 is configured to select the respective combination of the one or more expert neural networks based on at least one of a syntax or semantics of the text located at the position.

FIG. 2 is a flow diagram of an example process 200 for generating a mixture-of-experts (MoE) output for an input using an MoE subnetwork, e.g., the MoE subnetwork 130 of FIG. 1. For convenience, the process will be described as being performed by a system of one or more computers located in one or more locations. For example, a neural network system, e.g., the neural network system 100 of FIG. 1, appropriately programmed, can perform the process.

The system receives as input a first layer output generated by a neural network layer preceding the MoE subnetwork (step 202). The MoE subnetwork includes multiple expert neural networks and a gating subsystem that includes a gating subnetwork.

The system selects, based on the first layer output, one or more of the multiple expert neural networks and determines a respective weight for each selected expert neural network (step 204).

In particular, the system processes the first layer output to generate a weight vector that includes a respective weight for each of the multiple expert neural networks in accordance with a set of gating parameters of the gating subnetwork. The system then selects one or more of the multiple expert neural networks based on the weights in the weight vector. Specifically, the weight vector is a sparse vector that includes non-zero weights for only a few of the expert neural networks, and the system selects only expert neural networks that have non-zero weights in the weight vector. Generating the weight vector is described in more detail below with reference to FIG. 3.

The system provides the first layer output as input to each of the selected expert neural networks (step 206). Each of the selected expert neural networks is configured to process the first layer output in accordance with the respective current values of parameters of the selected expert neural network to generate a respective expert output.

The system then combines the expert outputs generated by the selected expert neural networks in accordance with the weights for the selected expert neural networks to generate the MoE output (step 208).

In particular, the system weights the expert output generated by each of the selected expert neural networks by the weight for the selected expert neural network to generate a weighted expert output. The system then sums the weighted expert outputs to generate the MoE output.

The system then provides the MoE output as input to a second neural network layer following the MoE subnetwork for further processing.

Figure 3:
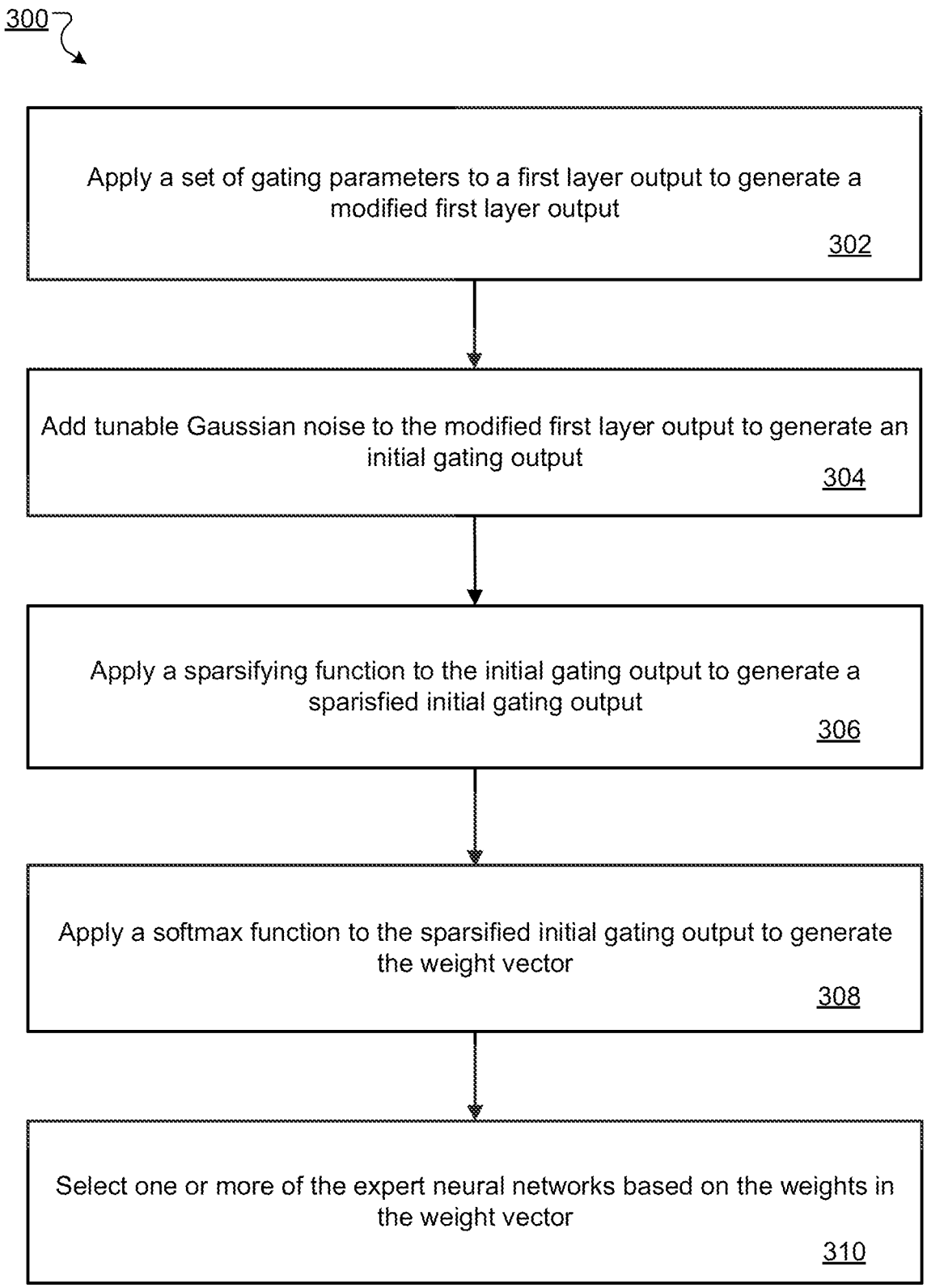
FIG. 3 is a flow diagram of an example process for determining a weight vector and for selecting one or more of the expert neural networks based on the weight vector.

FIG. 3 is a flow diagram of an example process 300 for determining a weight vector and for selecting one or more of the expert neural networks included in a MoE subnetwork, e.g., the MoE subnetwork 130 of FIG. 1, based on the weight vector. For convenience, the process will be described as being performed by a system of one or more computers located in one or more locations. For example, a neural network system, e.g., the neural network system 100 of FIG. 1, appropriately programmed, can perform the process.

The system applies a set of gating parameters of the gating subnetwork of the MoE subnetwork to a first layer output to generate a modified first layer output (step 302).

The system adds a noise to the modified first layer output to generate an initial gating output (step 304). The noise helps with load balancing, i.e., to encourage expert neural networks to receive roughly equal numbers of training examples in a training dataset during training, or to receive roughly equal numbers of input examples in input data during testing.

For example, the noise can be a tunable Gaussian noise. To add a tunable Gaussian noise to the modified first layer output, the system first applies a set of trainable noise parameters to the first layer output to generate an initial noise output. The system then element-wise multiplies the initial noise output by a vector of noise values sampled from a normal distribution to generate a final noise output. In some implementations, the system may apply a softplus function on the initial noise output before element-wise multiplying the initial noise output by the vector of noise values sampled from the normal distribution to generate the final noise output. The system then adds the final noise output to the modified first layer output to generate the initial gating output.

For example, the initial gating output for the first layer output x can be denoted as a vector H(x), which has a dimension equal to the number of expert neural network in the MoE subnetwork. The i-th element of H(x) that corresponds to the i-th expert neural network can be computed as follows:

$$H(x)_i = (x \cdot W_g)_i + \text{StandardNormal}(\ ) \cdot \text{Softplus}((x \cdot W_{noise})_i);$$

where $W_g$ is the set of gating parameters that is applied to the first layer output x to generate a modified first layer output $x \cdot W_g$; $W_{noise}$ is the set of trainable noise parameters; and StandardNormal( ) is a normal distribution that is used to sample the vector of noise values.

The system applies a sparsifying function to the initial gating output to generate a sparsified initial gating output (step 306). The sparsifying function sets all values in the initial gating output other than the k highest values to a value that is mapped to zero by a softmax function, where k is an integer. k can be determined based on criteria such as computational costs, model quality (e.g., prediction quality), and whether the MoE subnetwork is under a testing or training condition. Generally, smaller values of k require less computation while larger values of k lead to higher model quality. k is larger than 1 in order to train the MoE subnetwork. An example of the sparsifying function has the following form:

$$KeepTopK(v, k)_i = \begin{cases} v_i & \text{if } v_i \text{ is in the top } k \text{ elements of } v \\ -\infty & \text{otherwise} \end{cases}.$$

The sparsified initial gating output can be expressed as KeepTopK(H(x), k).

The system applies the softmax function to the sparsified initial gating output to generate a weight vector (step 308).

The weight vector is a sparse vector that includes non-zero weights for only a few of the expert neural networks. For example, the weight vector G(x) can be computed as follows:

$$G(x)=\text{Softmax}(\text{KeepTopK}(H(x),k)).$$

The system selects one or more of the expert neural networks based on the weights in the weight vector (step 310). Specifically, the system selects only expert neural networks that have non-zero weights in the weight vector.

During training of the neural network 102, the processes 200 and 300 can be used as part of generating a network output for a training input. The gradient of an objective function can be backpropagated to adjust the values of the parameters of various components of the neural network 102 to improve the quality of the network output relative to a known output for the training input.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
a main neural network implemented by one or more computers, the main neural network comprising a Mixture of Experts (MoE) subnetwork that comprises:
a plurality of expert neural networks, wherein the main neural network is configured to receive an input text sequence as input and to process the input text sequence to generate a network output, wherein the input text sequence has respective text located at a plurality of corresponding positions, and
a gating subsystem configured to:
for each position in the input text sequence, select a respective combination of one or more expert neural networks from the plurality of expert neural networks to be active for the processing of the text located at the position by the main neural network, wherein the gating subsystem is configured to select the respective combination of the one or more expert neural networks based on at least one of a syntax or semantics of the text located at the position.

2. The system of claim 1, wherein the plurality of expert neural networks have the same or similar architectures but different parameter values.

3. The system of claim 1, wherein the gating subsystem is configured to, for each position in the input text sequence, combine expert outputs generated by the one or more expert neural networks in the respective combination, wherein combining the expert outputs comprises:
weighting the expert output generated by each of the one or more expert neural networks in the respective combination by a weight associated with the expert neural network to generate a weighted expert output, and
summing the weighted expert outputs to generate a MoE output for the position.

4. The system of claim 1,
wherein the gating subsystem comprises a gating subnetwork, and wherein the gating subnetwork is configured to, for each position in the input text sequence:
generate a weight vector that includes a respective weight for each of the plurality of expert neural networks in accordance with a set of gating parameters, and
select the respective combination of one or more expert neural networks based on the weights in the weight vector.

5. The system of claim 4, wherein the weight vector is a sparse vector that includes non-zero weights for only a few of the expert neural networks.

6. The system of claim 4, wherein selecting one or more of the expert neural networks comprises:

selecting only expert neural networks that have non-zero weights in the weight vector.

7. The system of claim 1, wherein the gating subsystem comprises a parent gating subnetwork and a plurality of child gating subnetworks, and wherein each of the child gating subnetworks manages a disjoint subset of the plurality of expert neural networks from each other child gating subnetwork.

8. A computer-implemented method comprising:
receiving an input text sequence; and
processing the input text sequence using a main neural network to generate a network output for the network input, wherein the input text sequence has respective text located at a plurality of corresponding positions, wherein the main neural network is implemented by one or more computers and comprises a Mixture of Experts (MoE) subnetwork, wherein the MoE subnetwork comprises a plurality of expert neural networks, and
wherein processing the network input using the main neural network comprises:
for each position in the input text sequence, selecting a respective combination of one or more expert neural networks from the plurality of expert neural networks to be active for the processing of the text located at the position by the main neural network, wherein selecting the respective combination of the one or more expert neural networks is based on at least one of a syntax or semantics of the text located at the position.

9. The method of claim 8, wherein the main neural network comprises a gating subsystem configured to, for each position in the input text sequence, combine expert outputs generated by the one or more expert neural networks in the respective combination, wherein combining the expert outputs comprises:
weighting the expert output generated by each of the one or more expert neural networks in the respective combination by a weight associated with the expert neural network to generate a weighted expert output, and
summing the weighted expert outputs to generate a MoE output for the position.

10. The method of claim 8, further comprising:
for each position in the input text sequence, generating a weight vector that includes a respective weight for each of the plurality of expert neural networks in accordance with a set of gating parameters, and
selecting one or more of the expert neural networks based on the weights in the weight vector.

11. The method of claim 10, wherein the weight vector is a sparse vector that includes non-zero weights for only a few of the expert neural networks.

12. The method of claim 10, wherein selecting one or more the expert neural networks comprises:
selecting only expert neural networks that have non-zero weights in the weight vector.

13. One or more non-transitory computer storage media storing instructions that, when executed by one or more computers, cause the one or more computers to perform the operations comprising:

receiving an input text sequence; and
processing the input text sequence using a main neural network to generate a network output for the network input, wherein the input text sequence has respective text located at a plurality of corresponding positions, wherein the main neural network is implemented by one or more computers and comprises a Mixture of Experts (MoE) subnetwork, wherein the MoE subnetwork comprises a plurality of expert neural networks, and
wherein processing the network input using the main neural network comprises:
for each position in the input text sequence, selecting a respective combination of one or more expert neural networks from the plurality of expert neural networks to be active for the processing of the text located at the position by the main neural network, wherein selecting the respective combination of the one or more expert neural networks is based on at least one of a syntax or semantics of the text located at the position.

14. The one or more non-transitory computer storage media of claim 13, wherein the main neural network comprises a gating subsystem configured to, for each position in the input text sequence, combine expert outputs generated by the one or more expert neural networks in the respective combination, wherein combining the expert outputs comprises:
weighting the expert output generated by each of the one or more expert neural networks in the respective combination by a weight associated with the expert neural network to generate a weighted expert output, and
summing the weighted expert outputs to generate a MoE output for the position.

15. The one or more non-transitory computer storage media of claim 13, wherein the operations further comprise:
for each position in the input text sequence, generating a weight vector that includes a respective weight for each of the plurality of expert neural networks in accordance with a set of gating parameters, and
selecting one or more of the expert neural networks based on the weights in the weight vector.

16. The one or more non-transitory computer storage media of claim 15, wherein the weight vector is a sparse vector that includes non-zero weights for only a few of the expert neural networks.

17. The one or more non-transitory computer storage media of claim 15, wherein selecting one or more of the expert neural networks comprises:
selecting only expert neural networks that have non-zero weights in the weight vector.

18. The one or more non-transitory computer storage media of claim 13, wherein the gating subsystem comprises a parent gating subnetwork and a plurality of child gating subnetworks, and wherein each of the child gating subnetworks is configured to manage a disjoint subset of the plurality of expert neural networks from each other child gating subnetwork.

* * * * *